Feb. 14, 1939.                D. HOPPENSTAND                2,147,603
                              ATOMIZING DEVICE
                            Filed May 4, 1937              2 Sheets-Sheet 1
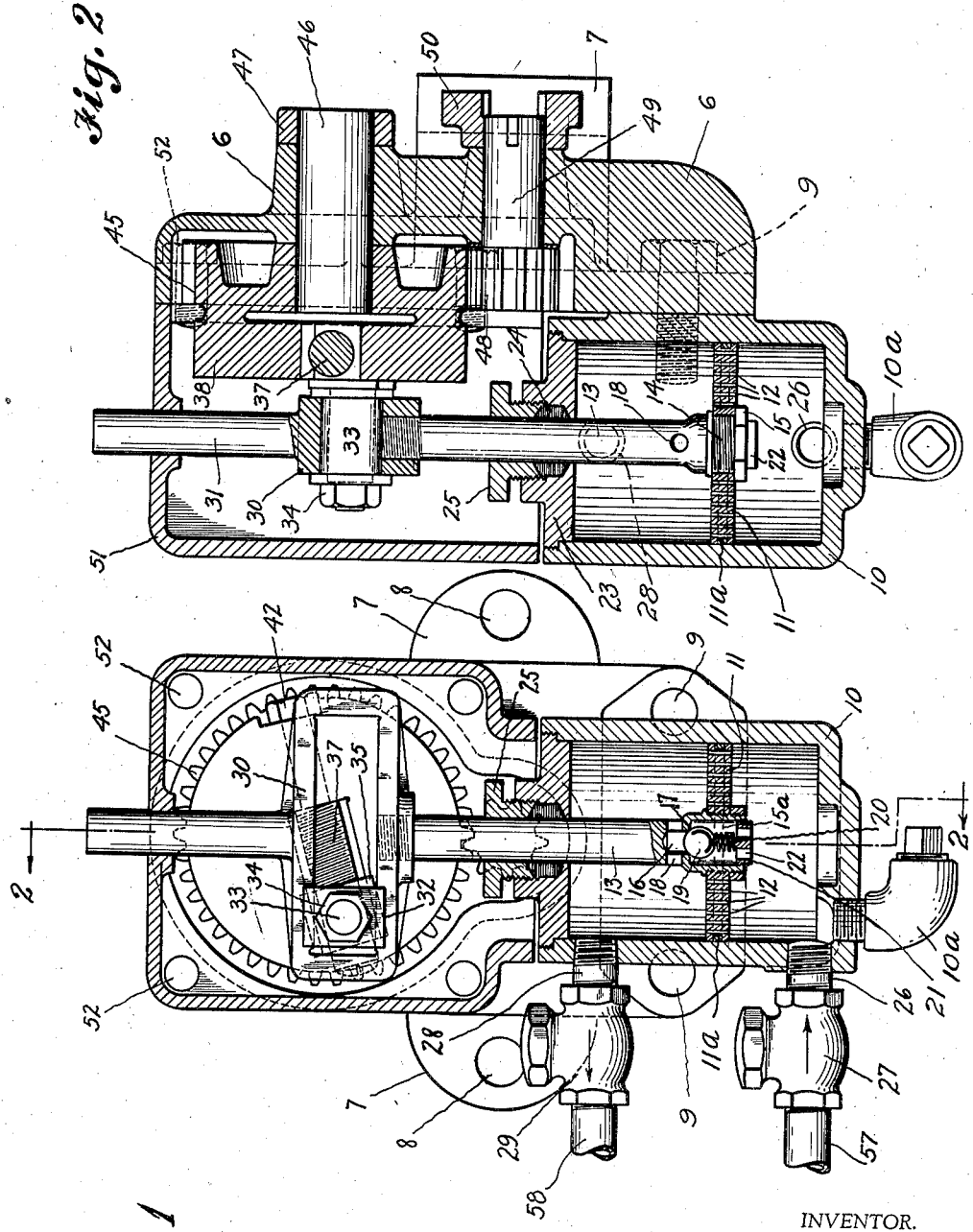
INVENTOR.
David Hoppenstand
BY
Stebbins, Blenko & Parmelee
ATTORNEYS

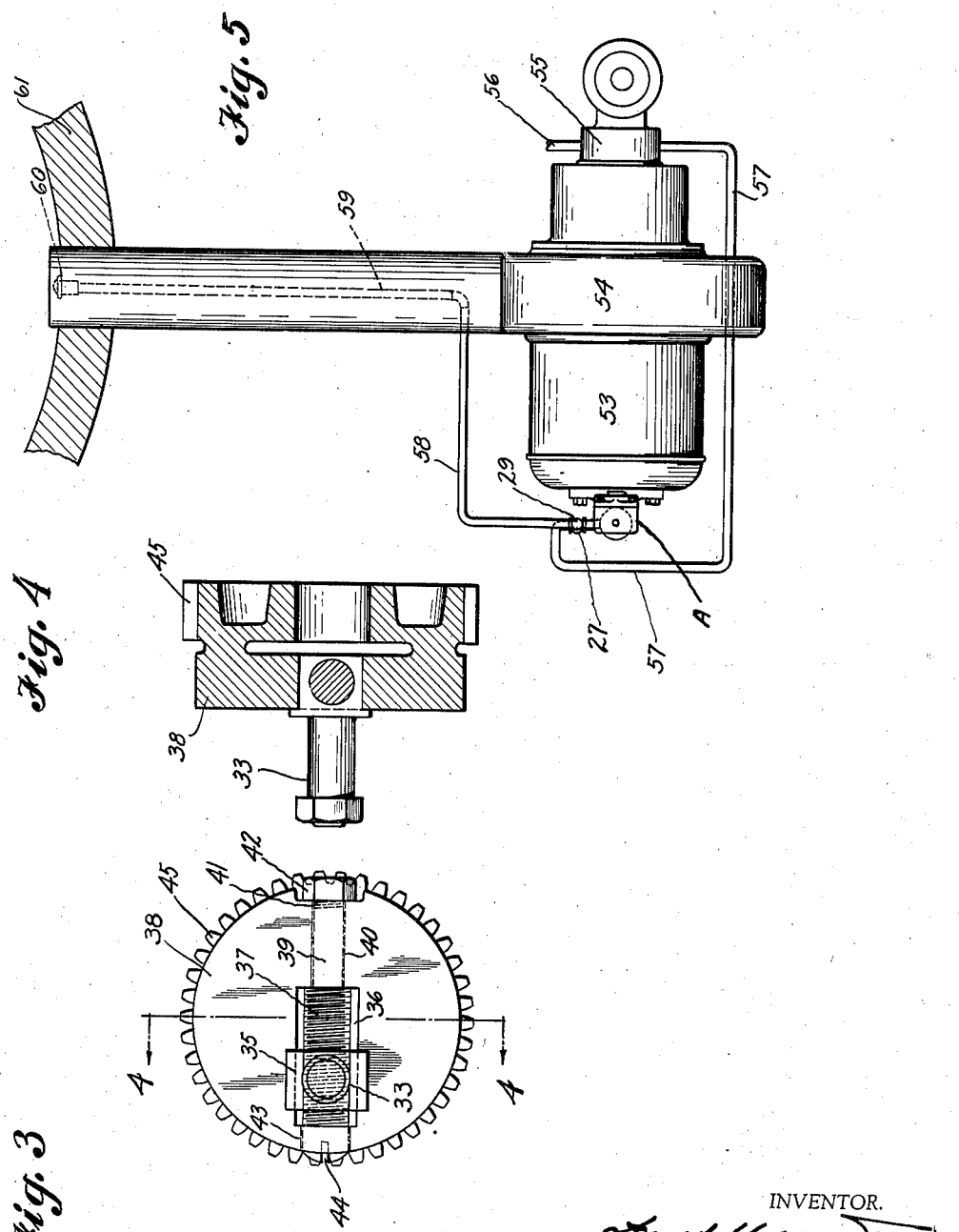

Patented Feb. 14, 1939

2,147,603

UNITED STATES PATENT OFFICE 2,147,603

ATOMIZING DEVICE

David Hoppenstand, Glenshaw, Pa., assignor to Hopkan Rivet Company, Inc., Pittsburgh, Pa., a corporation of Pennsylvania Application May 4, 1937, Serial No. 140,698

4 Claims. (Cl. 259—27)

This invention relates to atomizers and has for its principal object the breaking up of fuel oil into very fine particles so that it will not readily go back into its thick or heavy state. The oil may, if desired, be combined with a small amount of air during atomization. This condition of the oil facilitates combustion in fuel oil-consuming apparatus, such as oil-burners, gas or oil engines, etc. The oil is finely divided, flows more easily and can more readily be further atomized as it is forced through a burner tip or taken through a carbureter.

Fuel oil treated in accordance with my invention and mixed with air may be used in gas engines with only slight changes in the carburetion system. The principle of the apparatus is to force the oil through very fine openings a great number of times before it is used. Specifically the apparatus consists of an oil cylinder in which a very finely perforated piston is reciprocated at a proper rate of speed.

In the drawings:

Fig. 1 is a vertical cross section of the atomizer.

Fig. 2 is a section upon line 2—2 of Fig. 1.

Fig. 3 is a face view of the crank disk and crank pin.

Fig. 4 is a section upon the line 4—4 of Fig. 3, and

Fig. 5 is an arrangement drawing showing the hook up of my device in connection with an oil burner.

Referring more particularly to the drawings, a base or bracket 6 is provided with lugs 7 drilled as at 8 for securing it to any suitable support. A cylinder 10 is secured to bracket 6 by means of screws 9, Fig. 1 and Fig. 2. A drain fitting 10a is disposed at the lower end of the cylinder. In cylinder 10 is disposed a reciprocable piston 11, which is perforated with very fine holes 12. A piston ring 11a seals the space between the piston and the cylinder wall. The piston is secured to a piston rod 13 by a nut 15. The lower end of the rod is provided with a chamber 15A, the upper portion of which is reduced as shown at 16, forming a check valve seat 17. The upper portion 16 of the chamber communicates with ports 18 and is normally closed by a ball check valve 19 held in place by a spring 20. The spring 20 is held in position by a nut 21, provided with holes 22. The top part of the cylinder is closed by a cover 23, provided with packing 24 and the packing gland 25. The lower end of the cylinder is connected with an inlet pipe 26 and check valve 27, which will let oil pass into the cylinder only.

A pipe 28 connects near the top of the cylinder and with a check valve 29, which will permit oil to pass out of the cylinder only. To the top of the piston rod 13 is rigidly connected a cross slide 30 on the top side of which is formed or connected a rod portion 31, which is in line with piston rod 13.

Free to slide in the cross slide 30 is a block 32 rotatably mounted on a crank pin 33, the outer end of which is threaded and provided with a nut 34. The inner end of the crank pin is squared as at 35 and free to slide in a slot 36. Through the squared portion 35 of the crank pin 33 is passed a screw 37. This screw is located in the slot 36 of the crank disk 38, Fig. 3. The right hand portion of the screw 37 is turned down and provided with a shank 39 which passes through a hole 40 in the crank disk. The right hand end of shank 39 is threaded as at 41 and provided with a lock nut 42. The left hand end of the screw 37 passes through a hole 43, which is a little larger than the outside diameter of the screw. The left hand end of the screw 37 is provided with a screw driver slot 44. It is evident that by turning the screw 37, the crank pin 33 can be moved toward or from the center of crank disk 38.

Formed as a part of or secured to the crank disk 38 is a spur gear 45. The spur gear 45 is rigidly supported on a stub shaft 46, free to rotate in the supporting bracket 6. A collar 47 serves to prevent end play of the shaft 46. A pinion 48 is supported on a shaft 49, which is secured to the shaft of a motor 53, by any suitable means such as a jaw coupling 50. A cover 51 encloses the crank mechanism. The cover is secured in place by means of bolts 52. The rod 31 slidably protrudes through the top of the cover as shown in Fig. 1 and Fig. 2.

Referring to Fig. 5, A, shows the atomizing system secured in place at the end of a motor 53 for operating an oil burner. The usual fan is shown at 54 and the fuel pump at 55. A fuel supply pipe 56 for the fuel pump leads to a reservoir (not shown) and a discharge pipe 57 is connected to the lower check valve 27. A discharge pipe 58 leading from the top of the atomizer connects with a pipe 59, to which a burner tip 60 is attached and through which the oil is finally passed for entering the fire box 61.

The method of operation is as follows: As the oil burner is set into operation, the fuel pump 55 draws in oil through pipe 56 and discharges it through pipe 57, through check valve 27 into cylinder 10. The motor 53 drives pinion 48 and gear 45, rotating the crank disk 38. This, through the medium of crank pin 33 and cross slide 30, will cause piston rod 13 and piston 11 to reciprocate. As the piston moves downward, all the oil in the lower part of the cylinder will be forced through the small perforations 12, and as the piston is moved upward, the oil above the piston will pass partly through the perforations 12, but the greater part through ports 18, past the ball check valve 19 and through the holes 22 into the lower part of the cylinder. This relieves the pressure on the top side of the piston to a great extent and prevents an undue amount of oil from being forced out through pipe 28 and check valve 29, pipe 58 and finally the burner tip 60. Due to the capacity of the cylinder and the speed of piston 11, the oil will be forced several times through the perforations 12 before it is finally discharged through the burner tip. A small amount of air is taken in through the fuel pump and the oil and the air passed together through the atomizing device. If desired, my atomizing device may be connected on the suction side of the pump 55; that is check valve 27, Fig. 1 will be connected to the oil supply and the check valve 29 will be connected to the suction side of the pump and the pump discharge directly into the burner tip.

By turning screw 37, Fig. 3, changing the throw of the crankpin 33, the length of the stroke of the piston will be changed and the amount of the oil passing through the perforations 12 of the piston will be proportionately changed. With very light oils, the crank pin 33 may be brought very near to the center of the crank disk or to the center of the crank disk at which point no motion of the piston will take place.

While I have shown and described a particular form of embodiment of my invention, I am aware that many minor changes will readily suggest themselves to those skilled in the art, without departing from the spirit and scope of my invention. I desire, therefore, to avoid being limited to the particular form of embodiment which I have hereinabove shown and described. Having described my invention, what I claim as new and desire to protect by Letters Patent is:—

I claim:

1. Apparatus for atomizing fuel oil comprising a cylinder, a piston reciprocable therein having a plurality of perforations, means for reciprocating the piston in said cylinder, connections for supplying oil to the cylinder on one side of the piston and for discharging it therefrom on the other side of the piston, and means, including a passage many times larger than one of said perforations, for by-passing oil around said perforations on movement of the piston in one direction.

2. Apparatus for atomizing fuel oil comprising a cylinder, a piston reciprocable therein having a plurality of perforations, means for reciprocating the piston in said cylinder, connections for supplying oil to the cylinder on one side of the piston and for discharging it therefrom on the other side of the piston, a pump cooperating with said connections to supply oil to the cylinder, and means, including a passage many times larger than one of the perforations, for by-passing oil around the perforations on movement of the piston in one direction.

3. Apparatus for atomizing fuel oil comprising a cylinder, a piston reciprocable therein having a plurality of perforations, means for reciprocating the piston in the cylinder, connections for supplying oil to the cylinder on one side of the piston and for discharging it therefrom on the other side of the piston, said connections including check valves for preventing back-flow of oil on reversal of the piston, and means for by-passing oil around said perforations on movement of the piston in one direction.

4. An atomizing device comprising a cylinder, a piston therein having a plurality of perforations, means for reciprocating the piston in the cylinder, means including a pump and connections for supplying oil to the cylinder on one side of the piston and for discharging it therefrom on the other side of the piston, a check valve mounted on the piston, and a by-passing passageway controlled by said check valve having an area many times that of one of the perforations, whereby liquid in the cylinder will be forced through the perforations during one stroke of the piston and by-passed around the perforations during the opposite stroke of the piston.

DAVID HOPPENSTAND.